(12) United States Patent
Kisanagar et al.

(10) Patent No.: US 12,411,789 B2
(45) Date of Patent: Sep. 9, 2025

(54) DATA BUS WIDTH CONFIGURABLE INTERCONNECTION CIRCUITRY

(71) Applicant: XILINX, INC., San Jose, CA (US)

(72) Inventors: Surender Reddy Kisanagar, Hyderabad (IN); Sridhar Rudraraju, Hyderabad (IN); Chandrasekhar Srinivasaiah Thyamagondlu, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 291 days.

(21) Appl. No.: 18/109,742

(22) Filed: Feb. 14, 2023

(65) Prior Publication Data
US 2024/0273047 A1 Aug. 15, 2024

(51) Int. Cl.
*G06F 13/40* (2006.01)
(52) U.S. Cl.
CPC ...... *G06F 13/4027* (2013.01); *G06F 2213/40* (2013.01)
(58) Field of Classification Search
CPC .......................... G06F 13/4027; G06F 2213/40
See application file for complete search history.

(56) References Cited

U.S. PATENT DOCUMENTS

| | | | |
|---|---|---|---|
| 6,910,092 B2 * | 6/2005 | Calvignac | G06F 13/4265 710/310 |
| 7,111,108 B2 * | 9/2006 | Grundy | G06F 13/1684 710/305 |
| 7,295,554 B1 * | 11/2007 | Krishnamoorthy | H04L 5/22 370/535 |
| 7,685,364 B2 * | 3/2010 | Shaeffer | G11C 11/4076 711/115 |
| 8,984,203 B2 * | 3/2015 | Liu | G06F 13/1684 710/33 |
| 10,558,602 B1 * | 2/2020 | Diamand | G06F 13/1673 |

* cited by examiner

*Primary Examiner* — Nimesh G Patel
(74) *Attorney, Agent, or Firm* — Patterson + Sheridan, LLP

(57) ABSTRACT

An interconnection circuitry of an accelerator device includes a multiplexer, a first plurality of buffers, a second plurality of buffers, and a demultiplexer. The multiplexer is coupled to first offload circuitry and received data therefrom. The first plurality of buffers has inputs coupled to outputs of the multiplexer. A second plurality of buffers has inputs coupled to outputs of the first plurality of buffers. The demultiplexer includes inputs coupled to outputs of the second plurality of buffers and outputs coupled to inputs of programmable logic.

20 Claims, 7 Drawing Sheets

DATA BUS WIDTH CONFIGURABLE INTERCONNECTION CIRCUITRY

TECHNICAL FIELD

Embodiments of the present disclosure generally relate to accelerator devices for offloading processing tasks, and in particular, to flexible interconnection circuitry within an accelerator device that is able to support various bus data widths.

BACKGROUND

Intelligent server adapters, or smart network interface controllers (SmartNICs) or accelerator devices, boost server performance in cloud and data centers by offloading central processing unit (CPU) tasks, such as network and/or data processing. Intelligent server adapters accelerate network and/or storage intensive tasks by executing them directly on the intelligent server adapters independently of the software-controlled server CPUs, thereby eliminating the need to run these processing workloads on servers and freeing up CPU cycles, thus improving server performance and reducing overall power consumption, resulting in lower system-level total cost of ownership. Intelligent server adapters improve effective network bandwidth and throughput by executing offloaded functions on the faster processing hardware instead of the slower software driven server CPUs.

SUMMARY

In one example, an interconnection circuitry includes a multiplexer, a first plurality of buffers, a second plurality of buffers, and a demultiplexer. The multiplexer is coupled to first offload circuitry and received data therefrom. The first plurality of buffers has inputs coupled to outputs of the multiplexer. A second plurality of buffers has inputs coupled to outputs of the first plurality of buffers. The demultiplexer includes inputs coupled to outputs of the second plurality of buffers and outputs coupled to inputs of programmable logic.

In one example, an accelerator device includes first offload circuitry, and interconnection circuitry. The interconnection circuitry is coupled to the first offload circuitry. The interconnection circuitry includes a multiplexer, a first plurality of buffers, a second plurality of buffers, and a demultiplexer. The multiplexer is coupled to the first offload circuitry. The first plurality of buffers has inputs coupled to outputs of the multiplexer. The second plurality of buffers has inputs coupled to outputs of the first plurality of buffers. The demultiplexer has inputs coupled to outputs of the second plurality of buffers and outputs coupled to inputs of programmable logic.

In one example, a method includes determining, based on a data bus width of a first offload circuitry, a number of a first plurality of buffers and a number of a second plurality of buffers. Further, the method includes coupling inputs of the first plurality of buffers to outputs of a multiplexer. Inputs of the multiplexer are coupled to outputs of the first offload circuitry. The method further includes coupling inputs of the second plurality of buffers to outputs of the first plurality of buffers and coupling outputs of the second plurality of buffers to inputs of demultiplexer. Outputs of the demultiplexer are coupled to inputs of programmable logic.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
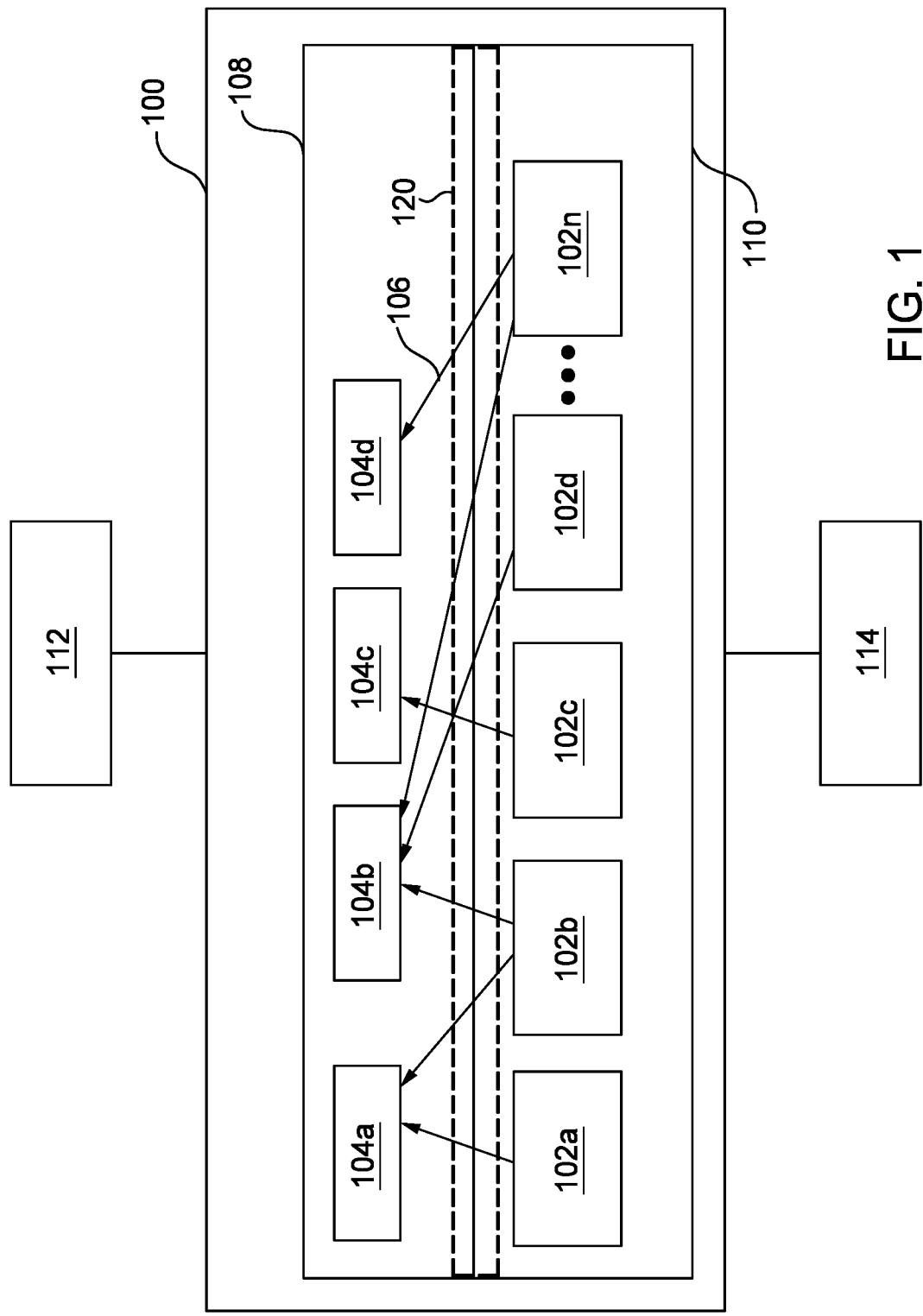
FIG. 1 illustrates a schematic block diagram of an accelerator device.

To facilitate understanding, identical reference numerals have been used, where possible, to designate identical elements that are common to the figures, and a lower-case letter added where the elements are substantially the same. It is contemplated that elements of one embodiment may be beneficially incorporated in other embodiments.

DETAILED DESCRIPTION

Data centers (e.g., cloud computing centers and other distributed data processing centers) employ multiple computer processing systems to perform various distributed computing processes. The computing processing systems include one or more central processing units (CPUs). In many instances, data centers further include accelerator devices (e.g., intelligent server adapters, or smart network interface controllers (SmartNICs)). The accelerator devices offload CPU tasks, improving the performance of the data centers. In one example, the tasks include network processing tasks and/or data processing tasks. The accelerator devices reduce processing performed by a software driven server CPU by offloading processor intensive tasks from the CPU. Offloading the processor intensive tasks frees up CPU cycles, improving server performance and reducing overall power consumption, resulting in lower system-level total cost of ownership of a data center.

An accelerator device improves the effective network bandwidth and throughput by executing offloaded functions within the faster processing hardware of the accelerator device instead of within slower software driven server CPUs. An accelerator device may be implemented as a peripheral device that is coupled to a host device (e.g., a computing device) to offload tasks from the CPU. In one or more examples, multiple accelerator devices may be coupled to a host device. Further, an accelerator device may offload tasks from one or more CPUs of a host device. In one example, multiple accelerator devices may offload tasks from one or more CPUs of a host device.

An accelerator device includes one or more offload circuitries and programmable logic. The offload circuitries are coupled with the programmable logic to perform tasks offloaded from a corresponding CPU. In an accelerator device interface connections are used to connect offload circuitries with the programmed portions of the programmable logic. In one example, the programmable logic includes programmed portions associated with different user applications, which are connected to the offload circuitries via the interface connections of interconnection circuitry. However due to the limited availability of the signal connections (pins) within the interconnection circuitry, a conventional accelerator device shares signal pins, and, consequently, multiplexes the functionality of the accelerator device on the pins.

The accelerator device described in the following employs asynchronous first-in-first-out shift registers (AFIFOs) to connect the offload circuitries with programmed circuit blocks of the programmable logic. The AFIFOs are grouped according to the data bus width of the offload circuitries. For example, the AFIFOs may be grouped into multiple groups, where each group has a data bus width at least as large as the data bus width of a respective offload circuitry. Further, as different offload circuitries are selected to be connected to different programmed circuit blocks, the AFIFOs are regrouped to accommodate the different data bus widths. Grouping together multiple AFIFOs to support the data bus widths of the offload circuitries, allows for the circuit size of the AFIFOs to be reduced as compared to conventional interconnection circuitry. Further, grouping of AFIFOs as described herein provides support for various data bus widths, accommodating offload circuitries with different data bus widths and reducing unused data bus width within the interconnection circuitry. Accordingly, the circuit size and manufacturing cost of the corresponding semiconductor device is reduced.

FIG. 1 illustrates a block diagram of an accelerator device 100, according to one or more examples. In one example, the accelerator device 100 is a field-programmable gate array (FPGA) device. For example, an accelerator device may be an embedded FPGA (eFPGA) peripheral device.

The accelerator device 100 is coupled to one or more host devices 114. For example, the accelerator device 100 is coupled to the host device 114 via an interconnect interface (e.g., a Peripheral Component Interconnect Express (PCIe) or another type interconnect interface). The accelerator device 100 is further coupled to one or more remote hosts 112. The accelerator device 100 may be coupled to the remote hosts 112 via a network connection. The accelerator device 100 may include a network interface that is able to communicate directly with the remote hosts 112 via the network connection. In another example, the accelerator device 100 communicates with the remote hosts 112 via a network interface of the host device 114.

The host device 114 includes one or more CPUs, one or more memory devices, and interface devices. The host device 114 may be coupled to the remote hosts 112 via a network interface. The host device 114 performs one or more processing functions and provides processed data to the remote hosts 112. The remote hosts 112 receive processed data from one or more host devices 114. The remote hosts 112 combine the process data received from two or more host devices 114 and/or further process the data received from the host devices 114. Further, the remote hosts 112 may communicate data received from one or more host devices 114 to another one or more host devices 114. The host device 114 and the remote hosts 112 are part of a distributed computing system. In one example, the remote hosts 112 are configured similar to the host device 114.

The offload circuitries 102 are formed within processor circuitry 110 (e.g., hardened circuitry) of the accelerator device 100. In one example, the processor circuitry 110 is application specific integrated circuit (ASIC) processor circuitry, and an offload circuitry 102 is an ASIC offload circuitry. In one or more examples, the offload circuitries 102 may be, for example but not limited to, direct memory access (DMA) engines, Data Splitters (like based on MPS), Data Encryption/Decryption engines, Data Compression/Decompression engines, and the like. The offload circuitries 102 perform tasks offloaded from a CPU within the host device 114, freeing up the CPU to perform other tasks. For example, the host device 114 uses the offload circuitries 102 to perform data splitting, data compression, and/or data encryption.

The programmed circuit blocks 104 are part of the programmable logic 108 of the accelerator device 100. The programmed circuit blocks 104 are generated within the programmable logic 108 based on configuration data. The configuration data may correspond to an application (e.g., a user application). Each of the programmed circuit blocks 104 may be programmed based on a different application (or portion of an application), and corresponding configuration data. Accordingly, two or more of the programmed circuit blocks 104 are configured to perform a different task or a different portion of a common task.

In one example, the programmable logic 108 includes circuitry that can be configured to implement various processing tasks. Functionality of the programmable logic 108 is programmed via configuration data. In one example, altering the functionality of the programmable logic 108 alters the interconnections between logic elements within the programmable logic 108 based on the configuration data, forming the programmed circuit blocks 104. The processor circuitry 110 is hardened logic circuitry that has a predetermined functionality (e.g., filters, mixers, sample-rate converters, and transform circuits, among others). The processor circuitry 110 may be programmable to configure specific predetermined functionalities or select among predetermined functionalities. However, in contrast to the programmable logic 108, the processor circuitry 110 cannot be configured or reconfigured with different functionality (e.g., additional functionalities cannot be added to or removed from the processor circuitry 110). In contrast, programmable logic can be reconfigured to add one more additional functionalities or to remove a functionality.

The offload circuitries 102 are coupled to the programmed circuit blocks 104 via the interconnection circuitry 120. The interconnection circuitry 120 includes one or more multiplexers, one or more demultiplexers, and AFIFOs. The multiplexers, the demultiplexers, and the AFIFOs form the interfaces 106 that connect the offload circuitry 102 with the programmed circuit blocks 104. As will be described in greater detail in the following, the AFIFOs are coupled between the multiplexers and demultiplexers, and are grouped based on the data bus width of each of the offload circuitries 102, to provide the interfaces 106.

Figure 2:
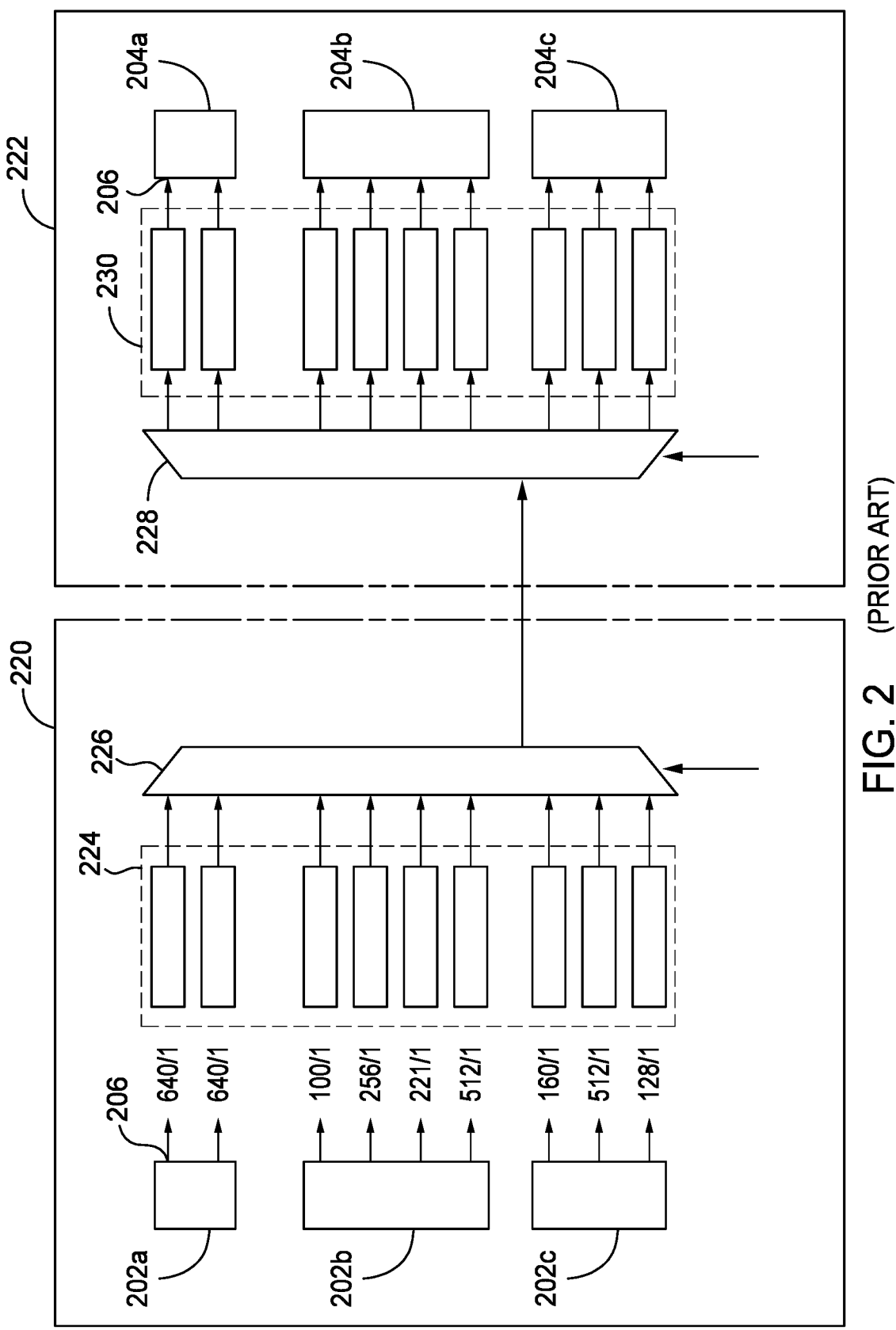
FIG. 2 illustrates a schematic block diagram of prior art fabric multiplexer and demultiplexer circuits.

Referring to FIG. 2, depicted is a block diagram of prior art fabric multiplexer and demultiplexer circuits. The hardened circuitry 220 and programmable logic 222 each use dedicated AFIFOs to provide the bandwidth, latency, timing, and clock domain crossing for each interface to send and/or receive data between offload circuitries 202a. 202b and 202c within the hardened circuitry 220 and the programmed circuit blocks 204a, 204b, and 204c of the programmable logic 222 by using valid/ready handshake signals to control the data flow. Each interface 206 may have one or more ready/valid handshake interfaces with data widths {640, 640}, {100,256,221,512}, {160,512,128} bits wide. Therefore, dedicated AFIFOs 224, 230, having the same data bus widths as each interface 206 are be provided. The respective AFIFOs 224, 230, and the interfaces 206 are selected with a multiplexer 226 and demultiplexer 228. The AFIFOs 224, 230 are required to be configured to handle full data bus widths for each interface 206. Accordingly, there is a need for a large number of AFIFOs that meet the full data bus width requirements of each associated offload circuitry 202. Having dedicated AFIFOs for each interface 206 increases the amount of circuit area used by a corresponding integrated circuit (IC) device, and the circuit area used by the AFIFOs 224, 230 increases as the number of interfaces 206 and/or the corresponding number of interfaces and/or corresponding data bus widths increase.

Thus, there is a need for reducing the number of AFIFOs and corresponding circuit area used for data transfer to and from high-speed data processing peripherals, e.g., offload circuitries 102, while achieving expected bandwidth, latency, timing, and clock domain crossings.

Figure 3:
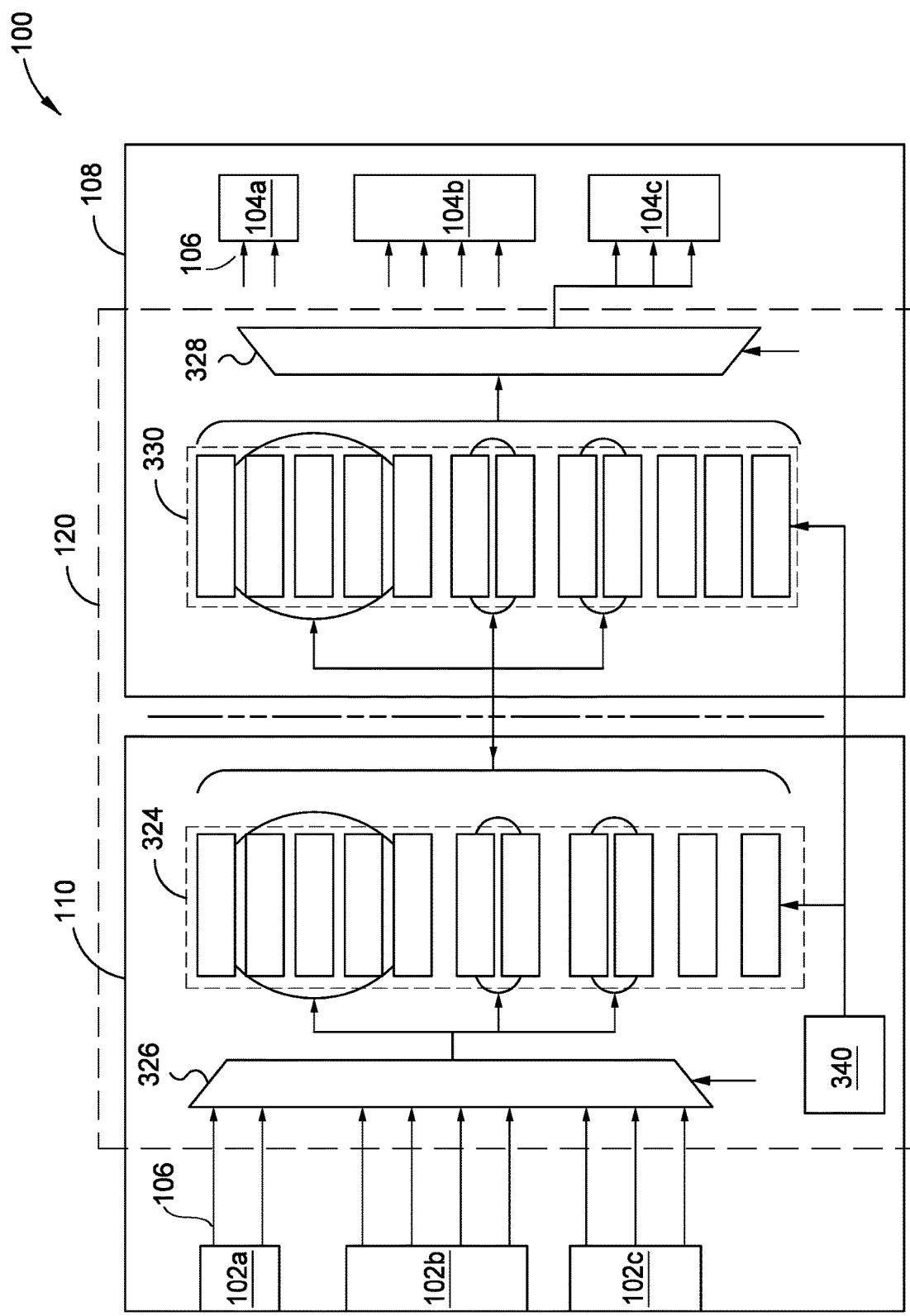
FIG. 3 illustrates a schematic block diagram of interconnection circuitry.

In the example of FIG. 3, instead of requiring a large data width AFIFO for each interface 106, a plurality of AFIFOs 324, 330 having a smaller data width than that used in the example of FIG. 2, e.g., data width equal to 16/32/48 bits wide, are grouped together to provide the necessary data width of the interfaces 106. The AFIFOs 324, 330 are grouped to increase the combined data width of the grouped AFIFOs to at least match the corresponding interface 106. These AFIFO 324, 330 are connected to the output of the multiplexer of the processor circuitry 110 (e.g., the multiplexer 326 of FIG. 3), and to the input of the demultiplexer of the programmable logic 108 (e.g., the demultiplexer 328 of FIG. 3), improving the bandwidth, latency, timing, and clock domain crossings of the interfaces 106.

Figure 5:
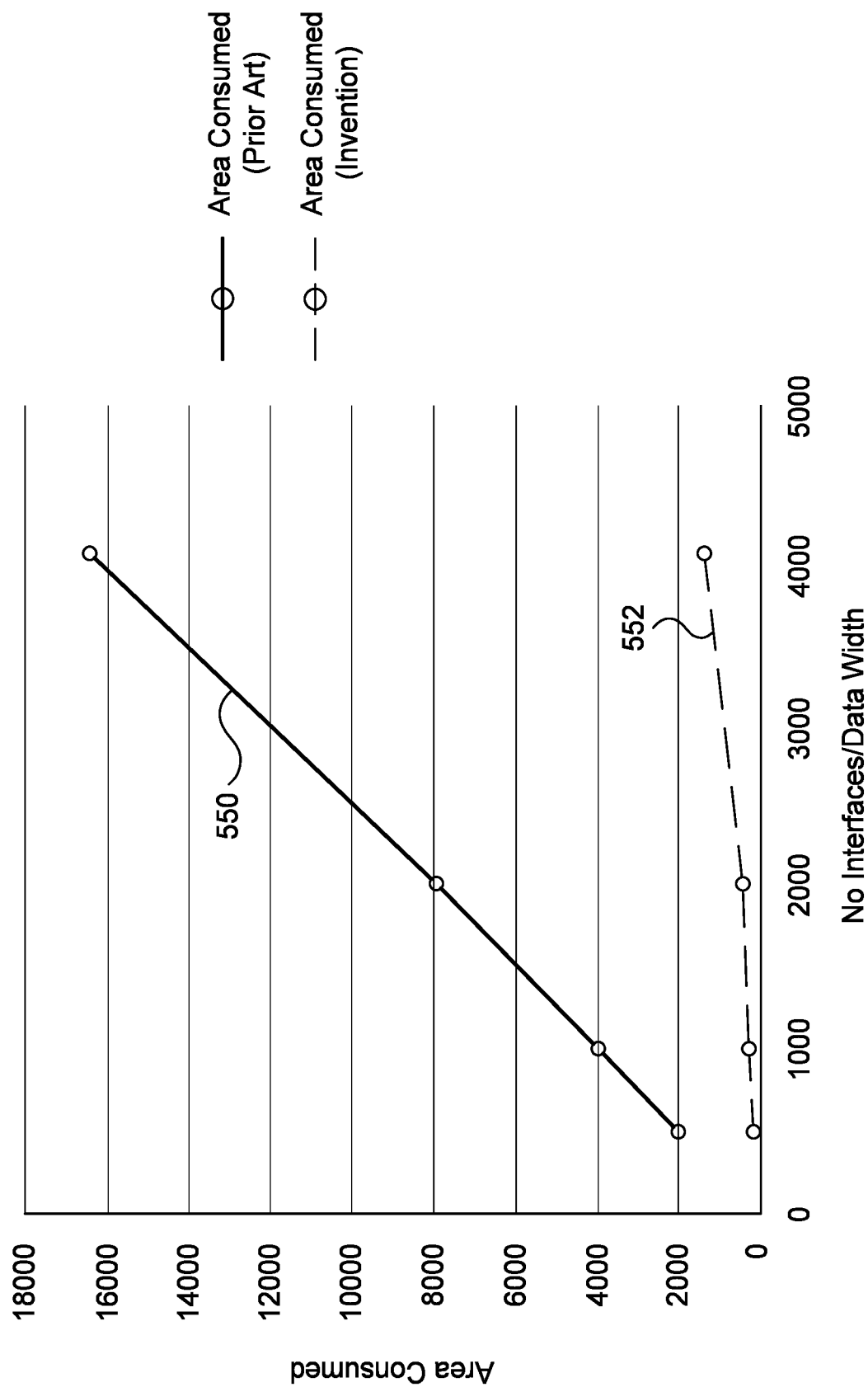
FIG. 5 illustrates a schematic comparison graph of circuit area of different interconnection circuitries.

Thus, the total number of AFIFOs within an accelerator device (e.g., the accelerator device 100 of FIG. 1) are reduced, reducing the cost of the accelerator device. Further, scaling up to accommodate more offload circuitries (e.g., offload circuitries 102 of FIG. 1) does not significantly impact the circuit area used by the AFIFOs (e.g., AFIFOs 324, 330), because existing AFIFO are reused and regrouped for each offload circuitry interface selected for data transfer. Referring to FIG. 5, depicted is a schematic comparison graph of circuit area used by the prior art solution of FIG. 2, represented by graph line 550, and the circuit area when using repurposed (reconfigured) AFIFOs at the outputs of the multiplexer and demultiplexers as described with regard to FIG. 3, represented by graph line 552. As is illustrated in FIG. 5, as the data width increases, the circuit area when using repurposed AFIFOs as described herein is less than that of the circuit area of a prior art solution of FIG. 2. Further, as is described herein, using repurposed AFIFOs allows for the same performance and latency to be achieved while using significantly less circuit area and number of AFIFO circuits, as compared to a convention accelerator device.

Examples of the present disclosure relate to efficient and cost-effective transfer of data between accelerator devices (e.g., accelerator device 100 of FIG. 1), host devices (e.g., host device 114 of FIG. 1) and remote hosts (e.g., remote hosts 112 of FIG. 1). As is described above, accelerator devices offer offload functionalities and provide different interfaces that are able to serve the unique needs of a computer data processing system. However due to the limited availability of signal connections (pins) within the interconnection circuitry of a conventional accelerator device, the pins are shared and multiplexing is used communicate between the offload circuitries and the programmed circuit blocks. As is described in greater detail in the following, a wide data width multiplexer, a wide data width demultiplexer, and a plurality of narrow data width AFIFOs are used to provide interconnection between offload circuitries and programed circuit blocks. A wide data width multiplexer and demultiplexer have a data width of 256 bits, 512 bits, 1024 bits, or greater. In other examples, a multiplexer and/or demultiplexer having a data width of less than 256 bits may be used. The AFIFOs are grouped together and coupled to the wide data width multiplexer and demultiplexer to provide data transfers over a wide data width bus, mitigating the sharing of pins and multiplexing within the accelerator device.

According to examples disclosed herein, a multiplexer selects an interconnection based upon operational requirements of the corresponding offload circuitry and programmed circuit blocks, providing clock domain crossing functionality between a processor circuitry clock domain to a programmable logic clock domain. In one example, data is provided to (e.g., pushed) to the AFIFOs based on a first clock signal (e.g., in a first clock domain) and output from (e.g., popped) from the AFIFOs based on a second clock signal (e.g., in a second clock domain). For example, data is provided from the offload circuitry 102a via the multiplexer 326 to a first group of the AFIFOs 324 during a cycle of a clock signal associated with the processor circuitry 110. Further, the data is output from the AFIFOs 324 in a cycle of a clock signal associated with the programmable logic 108. Accordingly, the data crosses over from the clock domain of the processor circuitry 110 to the clock domain of the programmable logic 108. In one or more examples, the frequency of the clock domain of the processor circuitry 110 is greater than or less than the frequency of the clock domain of the programmable logic 108. The data is loaded into the AFIFOs 324 in one clock cycle of a first clock signal, and the data is output from the AFIFOs 324 in one clock cycle of a second clock signal. In one or more examples, the interconnection circuitry (e.g., the interconnection circuitry 120 of FIG. 1) operates at a frequency of at least 433 MHZ, and uses at least sixteen AFIFOs. In other examples, other operating frequencies and/or more than or less than sixteen AFIFOs may be used. In one or more examples, credit-based mechanisms are used to meet bandwidth and timing requirements. Further, head of line blocking (HOL) blocking corresponding to a multiplexer is avoided as all buffering is handled at the outputs of the multiplexer.

Referring to FIG. 3, depicted is a block diagram of the interconnection circuitry 120 of the accelerator device 100 of FIG. 1, according to one or more examples The interconnection circuitry 120 includes multiplexer 326, AFIFOs 324, AFIFOs 330, and demultiplexer 328.

The interconnection circuitry 120 is partially formed within the processor circuitry 110 and the programmable logic 108. The interconnection circuitry 120 couples the offload circuitries 102 with the programmed circuit blocks 104. In one example, the multiplexer 326 and the AFIFOs 324 are formed within the processor circuitry 110, and the AFIFOs 330 and the demultiplexer 328 are formed within the programmable logic 108. The data width of the multiplexer 326 is greater than that of each of the AFIFOs 324. Further, the data width of the demultiplexer 328 is greater than that of each of the AFIFOs 330.

In one example, data is output from the offload circuitries 102 and received by the programmed circuit blocks 104 via the multiplexer 326, the AFIFOs 324, the AFIFOs 330, and the demultiplexer 328. In one example, inputs of the multiplexer 326 are coupled to outputs of the offload circuitries 102. Output or outputs of the multiplexer 326 are coupled to inputs of the AFIFOs 324. Outputs of the AFIFOs 324 are coupled to input to inputs of the AFIFOs 330. Outputs of the AFIFOs 330 are connected to inputs of the demultiplexer 328. Outputs of the demultiplexer 328 are coupled to inputs the programmed circuit blocks 104.

The AFIFOs 324, 330 have a data width of about 16/32/48 bits wide. By locating the AFIFOs 324 at the outputs of the multiplexer 326, and locating the AFIFOs 330 at the inputs of the demultiplexer 328, the opposite of what is shown in the prior art solution of FIG. 2, the number of AFIFOs 324, 330 needed to provide for the worst case (e.g., maximum) data width is reduced. In addition to selecting the interface 106 of an offload circuitry 102 and programmed circuit block to be used, the multiplexer 326 and demultiplexer 328 may also select which ones, or groups, of the AFIFOs 324 and 330 are used for the data transfers from/to the selected offload circuitry 102. In one example, the multiplexer 326 receives a control signal or signals that indicates which offload circuitry 102 to couple with which ones, or groups, of the AFIFO 324. Further, the demultiplexer 328 receives a control signal or signals that indicates which ones, or groups, of AFIFOs 330 to connect with which programmed circuit block 104.

In one example, when the offload circuitry 102a and programmed circuit block 104a are selected for use, the multiplexer 326 and demultiplexer 328 couples the corresponding interface 106 to a corresponding number of AFIFOs 324, 330 having a combined data width sufficient to pass the data (at full data width) from the offload circuitry 102a to the programed circuit block 104a. The AFIFOs 324, 330 are reused (repurposed) and may be selected in any order and number so long as the combined data bus widths of the selected AFIFOs 324, 330 are sufficient to match the data widths of the selected offload circuitry(s) 102 and corresponding interface(s) 106. For example, an AFIFO, or group of AFIFOs, 324, 330 used to provide an interconnection between the offload circuitry 102b and the programmed circuit block 104b may additionally be used to provide an interconnection between the offload circuitry 102c and the programmed circuit block 104c.

In one example, the accelerator device 100 includes control circuitry 340 that is coupled to the AFIFOs 324 and 330. The control circuitry 340 groups the AFIFOs 324 and 330 based on the selected offload circuitry (or engine) 102 and the corresponding interface (or interfaces) 106 such that the data bus width of the grouped AFIFOs 324 and 330 is at least at large as that of the interface(s) 106 of the selected offload circuitry(s) 102. The control circuitry 340 may receive a signal from a CPU of a host device (e.g., host device 114), the multiplexer 326 and demultiplexer 328, or other control circuitry that indicates which of the offload circuitries 102 is selected. The control circuitry 340 determines the grouping of the AFIFOs 324 and 330 based on the data bus width of the interface(s) 106 of the selected offload circuitry(s) 102 and provides control signals to the AFIFOs 324 and 330 to group the AFIFOs 324 and 330 accordingly. As different offload circuitries 102 are selected, the control circuitry 340 provides control signals that groups the AFIFOs 324 and 330 accordingly. In one or more examples, the control circuitry 340 is omitted, and the multiplexer 326 and demultiplexer 328 perform the grouping and connections between AFIFOs 324 and 330. While the control circuitry 340 is illustrated as being within the processor circuitry 110, in other examples, the control circuitry 340 may be disposed within the programmable logic 108, or in a device external to the accelerator device 100 (e.g., the host device 114).

In one or more examples, while AFIFOs 324 and 330 are described in the above (and in the following), other types of buffers may be used without deviating from the above description. For example, synchronous FIFOs, and last in first out (LIFO) buffers, and data buffers that receive data in any order and output data in any order, among others (e.g., unordered buffer). In one or more example, in the above description AFIFOs 324 may be buffers and AFIFOs 330 may be buffers. The buffers may be any one or more of AFIFOs, FIFOs, synchronous FIFOs, LIFO buffers, and unordered buffers, among others.

Figure 4:
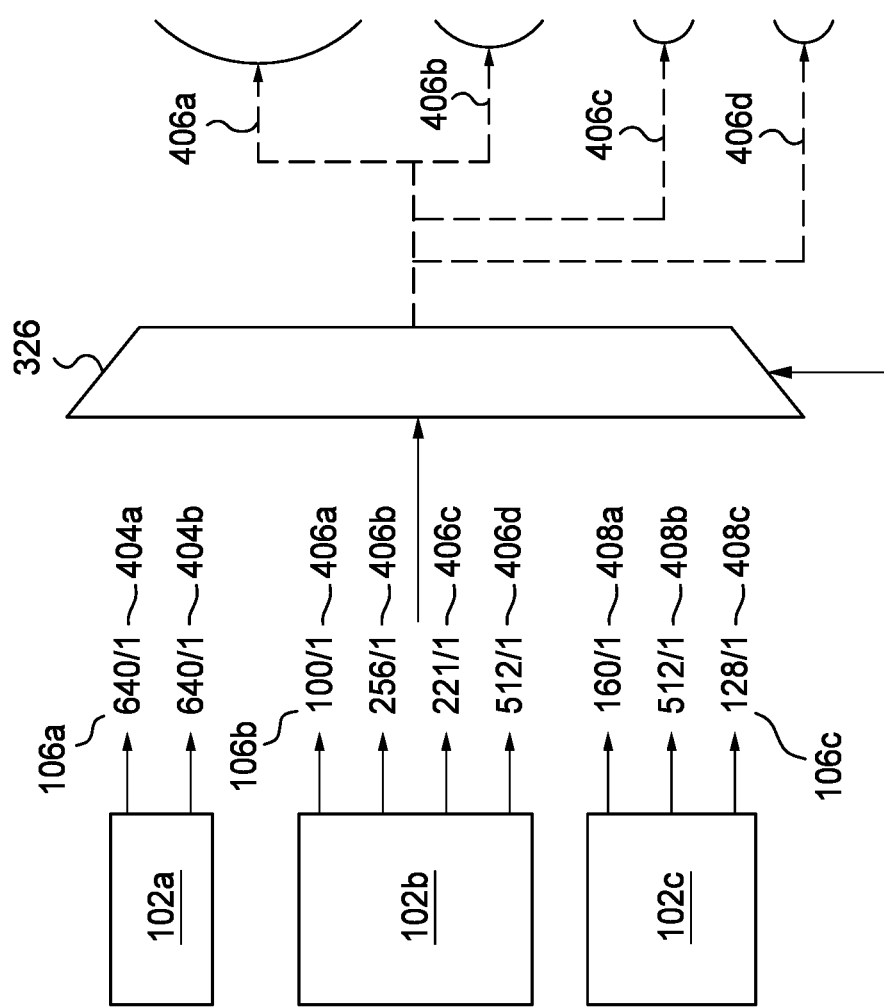
FIG. 4 illustrates a schematic block diagram of a configuration of AFIFOs for an accelerator device.

Referring to FIG. 4, depicted is a schematic block diagram of a configuration of the AFIFOs 324 of the accelerator device 100. In the example of FIG. 4, the offload circuitry 102b is associated with an interface 106b having interfaces 406a, 406b, 406c and 406d. The interfaces 406a, 406b, 406c, and 406d have 100, 256, 221 and 512 bit wide data buses, respectively. The multiplexer 326 couples the each of the interfaces 406a, 406b. 406c and 406d to an appropriate number of AFIFOs 324. In one example, each of the AFIFOs 32 are 32 bits wide. Referring back to FIG. 3, likewise the demultiplexer 328 couples the interfaces 406a, 406b, 406c, and 406d to an appropriate number of AFIFOs 330. In one example, the data width of the AFIFOs 330 is 32 bits wide.

For the offload circuitry 102b and the interfaces 406a, 406b, 406c, and 406d having 100, 256, 221 and 512 bit wide data buses, thirty-five AFIFOs 324 are used. For example, four AFIFOs 324 are used for the interface 406a to provide a data width of 100 bits, eight AFIFOs 324 are used for the interface 406b to provide a data width of 256 bits, seven AFIFOs 324 are used for the interface 406c to provide a data width of 221 bits, and sixteen AFIFOs 324 are used for the interface 406d to provide a data width of 512 bits. Further, to support the interfaces 404a, 404b of interface 106a of the offload circuitry 102b, forty AFIFOs 324 are used. For example, twenty AFIFOs 324 are used for the interface 404a to provide a data width of 640 bits, and twenty AFIFOs 324 are used for the interface 404b to provide a data width of 640 bits. To support the interfaces 408a, 408b, 408c of interface 106c of the offload circuitry 102c, twenty-five AFIFOs 324 are used. For example, five AFIFOs 324 are used for the interface 408a to provide a data width of 160 bits, sixteen AFIFOs 324 are used for the interface 408b to provide a data width of 512 bits, and four AFIFOs 324 are used for the interface 408a to provide a data width of 128 bits. Accordingly, the largest number of AFIFOs 324 used to support the interfaces 106a, 106b, and 106c is forty. Similarly, the AFIFOs 330 are grouped in a similar way to support the interconnections between the AFIFOs 324 and the programmed circuit blocks 104a.

Figure 7:
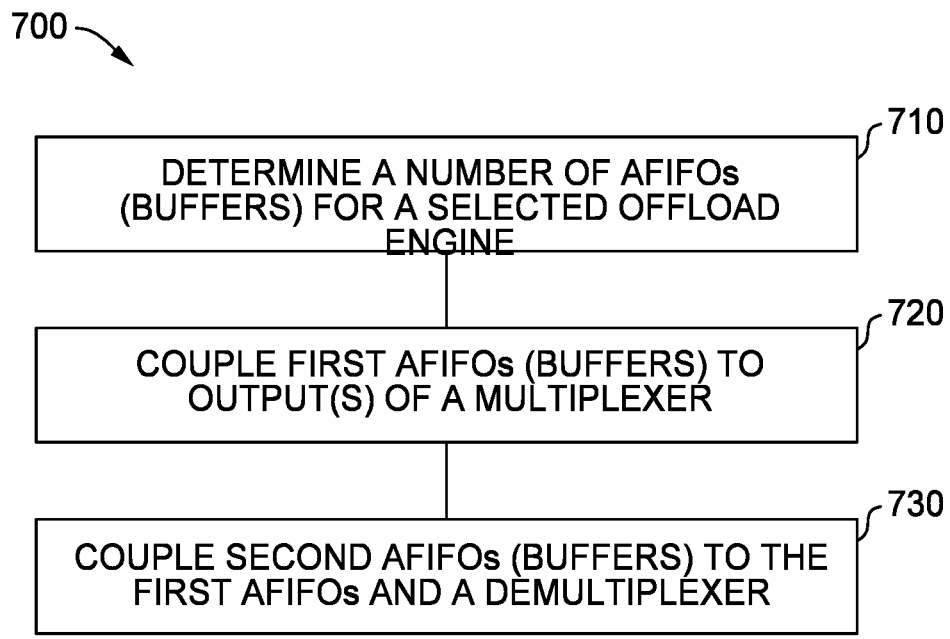
FIG. 7 illustrates a flowchart of a method for coupling AFIFOs to a multiplexer and demultiplexer.

FIG. 7 illustrates a flowchart of a method 700 for coupling the AFIFOs 324, 330 with the offload circuitries 102 and the programmed circuit blocks 104. At 710 of the method 700, the number of AFIFOs 324, 330 are determined for grouping for a selected offload circuitry. For example, the control circuitry 340 determines the number and groupings of the AFIFOs 324, 330 based on the selected offload circuitry. In one example, the number and groupings of AFIFOs 324, 330 are determined to support the interfaces of the interfaces 106 based on the selected offload circuitry(s) 102. The AFIFOs 324, 330 are selected by control circuitry 340 connected to the AFIFOs 324, 330 based on the interface 106 (and interfaces) selected by the multiplexer 326 and the demultiplexer 328. In one example, an offload circuitry 102 is selected for use in processing data provided by a CPU of the host device 114. In one example, an offload circuitry 102 is selected based on the type of data to be processed and/or task to be offloaded from the host device 114. In one example, the host device 114 indicates which of the offload circuitries 102 to be selected. In one example with reference to FIG. 3 and FIG. 4, the offload circuitry 102b is selected. The offload circuitry 102b includes interface 106b and interfaces 406a, 406b, 406c, and 406d have a data bus width of 100 bits, 256 bits, 221 bits, and 512 bits, respectively. In one example, the control circuitry 340 determines the groupings of AFIFOs 324, 330 based on the data bus widths of the interfaces 406a, 406b, 406c, and 406d. For example, the control circuitry 340 determines that four AFIFOs 324 are used to support the interface 406a to provide a data width of 100 bits, eight AFIFOs 324 are used to support the interface 406b to provide a data width of 256 bits, seven AFIFOs 324 are used to support the interface 406c to provide a data width of 221 bits, and sixteen AFIFOs 324 are used to support the interface 406d to provide a data width of 512 bits. The control circuitry 340 groups the AFIFOs 324, 330 accordingly to support the interfaces 406a, 406b, 406c, and 406d. For example, the AFIFOs 324, 330 are grouped to accommodate the data bus widths for each of the interfaces of the interfaces 106 such that the combined data bus widths of the AFIFOs 324, 330 are at least as large as the data bus widths of the corresponding interfaces. In some examples, concatenating control and data transfers for each group of AFIFOs 324, 330 associated with respective ones of the interfaces 106. The number of AFIFOs 324, 330 is determined to accommodate (be at least as large as) all of the data bus widths of the interfaces of the selected offload circuitry 102.

At 720 of the method 700, first AFIFOs are coupled to output(s) of a multiplexer. For example, the control circuitry 340 couples a first one or more AFIFOs 324 to an output of the multiplexer 326. The one or more AFIFOs 324 corresponds to a first interface 106 of a selected offload circuitry 102. In an example where the first interface is interface 406a of FIG. 4, the control circuitry 340 couples four AFIFOs 324 to an output of the multiplexer 326. Further, for the interface 406b, eight AFIFOs 324 are coupled to an output of the multiplexer 326, for the interface 406c, seven AFIFOs 324 are coupled to an output of the multiplexer 326, and for the interface 406d, sixteen AFIFOs 324 are coupled to an output of the multiplexer 326.

In one or more examples, data is provided (e.g., pushed) to each AFIFO 324 of a first group of AFIFOs 324 based on a first clock cycle of a clock signal of the processor circuitry 110. Further, data is output (e.g., popped) from each AFIFO 324 of the first group of AFIFOs 324 based on a first clock cycle of a clock signal of the processor circuitry 110. Accordingly, data is loaded into each of the first group of the AFIFOs 324 during an overlapping period. In one example, each AFIFO 324 of a first group is provided with data based on each of the AFIFOs of the first group having data capacity (e.g., being empty or containing data and not being full). The control circuitry 340 determines whether or not that each of the AFIFOs having data capacity. In other examples, another circuitry of the accelerator device 100 determines whether or not that each of the AFIFOs have data capacity. In one or more examples, data is output (e.g., popped) from a group of the AFIFOs 324 to a group of the AFIFOs 330. Data is output from each AFIFO 324 of a first group based on each, or at a least one, of the AFIFOs 324 of the contain data. The control circuitry 340 determines whether or not that the AFIFOs 324 contain data, and data is output based on the determination that the AFIFOs 324 contain data. In other examples, another circuitry of the accelerator device 100 determines whether or not that the AFIFOs 324 contain data. Receiving data based on the AFIFOs 324 being determined to be empty and output data based on the AFIFOs 324 being determined to contain data mitigates skew that may occur within an individual AFIFO 324 when communicating data to the AFIFOs 330.

At 730 of the method 700, second AFIFOs are coupled to the first AFIFOs and to a demultiplexer. For example, the control circuitry 340 couples a first one or more AFIFOs 330 to outputs of the AFIFOs 324 and to an input of the demultiplexer 328. The one or more AFIFOs 330 corresponds to a first interface 106 of a selected offload circuitry 102. The grouped AFIFOs 330 are connected to a corresponding group of the AFIFOs 324. In an example where the first interface is interface 406a of FIG. 4, the control circuitry 340 couples four AFIFOs 330 to outputs of a group of four AFIFOs 324 and to an input of the demultiplexer 328. Further, for the interface 406b, eight AFIFOs 330 are coupled to outputs of a group of eight AFIFOs 324 and to an input of the demultiplexer 328, for the interface 406c, seven AFIFOs 324 are coupled to outputs of a group of seven AFIFOs 324 and to an input of the demultiplexer 328, and for the interface 406d, sixteen AFIFOs 330 are coupled to outputs of a group of sixteen AFIFOs 324 and to an input of the demultiplexer 328. Accordingly, by performing the method 700 of FIG. 7, an interface is provided from a selected offload circuitry 102 through the multiplexer 326, the AFIFOs 324, 330, and the demultiplexer 328 to the programmed circuit blocks 104, such that the data bus width of the interface is supported by the number of grouped AFIFOs 324 and 330.

In one or more examples, data is provided (e.g., pushed) to each AFIFO 330 of a first group of AFIFOs 330 based on the same clock cycle of a clock signal of the programmable logic 108. Further, data is output (e.g., popped) from each AFIFO 330 of the first group of AFIFOs 330 based on the same clock cycle of a clock signal of the processor circuitry 110. In one example, each AFIFO 330 of a first group is provided with data based on each of the AFIFOs 330 of the first group have data capacity. The control circuitry 340 determines whether or not that each of the AFIFOs 330 have data capacity. In other examples, another circuitry of the accelerator device 100 determines whether or not that each of the AFIFOs 330 have data capacity. Further, data is output from each AFIFO 324 of a group based on each, or at least one, of the AFIFOs of the group containing data. The control circuitry 340 determines whether or not that the AFIFOs 330 containing data. In other examples, another circuitry of the accelerator device 100 determines whether or not that the AFIFOs 330 contain data. Further, the data is output (e.g., popped) from the group or groups of the AFIFOs 330 to the demultiplexer 328.

In one or more examples, the AFIFOs 330 are synchronized with the AFIFOs 324 via credit signals. For example, internal counters of the credits are maintained to indicate the AFIFO depth (e.g., outstanding requests holding capacity). The counters are decremented every time a valid signal and data is asserted. The valid signal is deasserted if there are not enough credits in the corresponding credit counter. In one example, a data transmitter (e.g., an offload circuitry 102) increments the credit counter every time a credit increment is received from the data receiver (e.g., a programmed circuit block 104). As is described in further detail in the following, this allows the valid signal to be decoupled from the ready signal and allows for adding repeater flip-flops (source synchronous) on the valid/data and ready signals independently.

Figure 6:
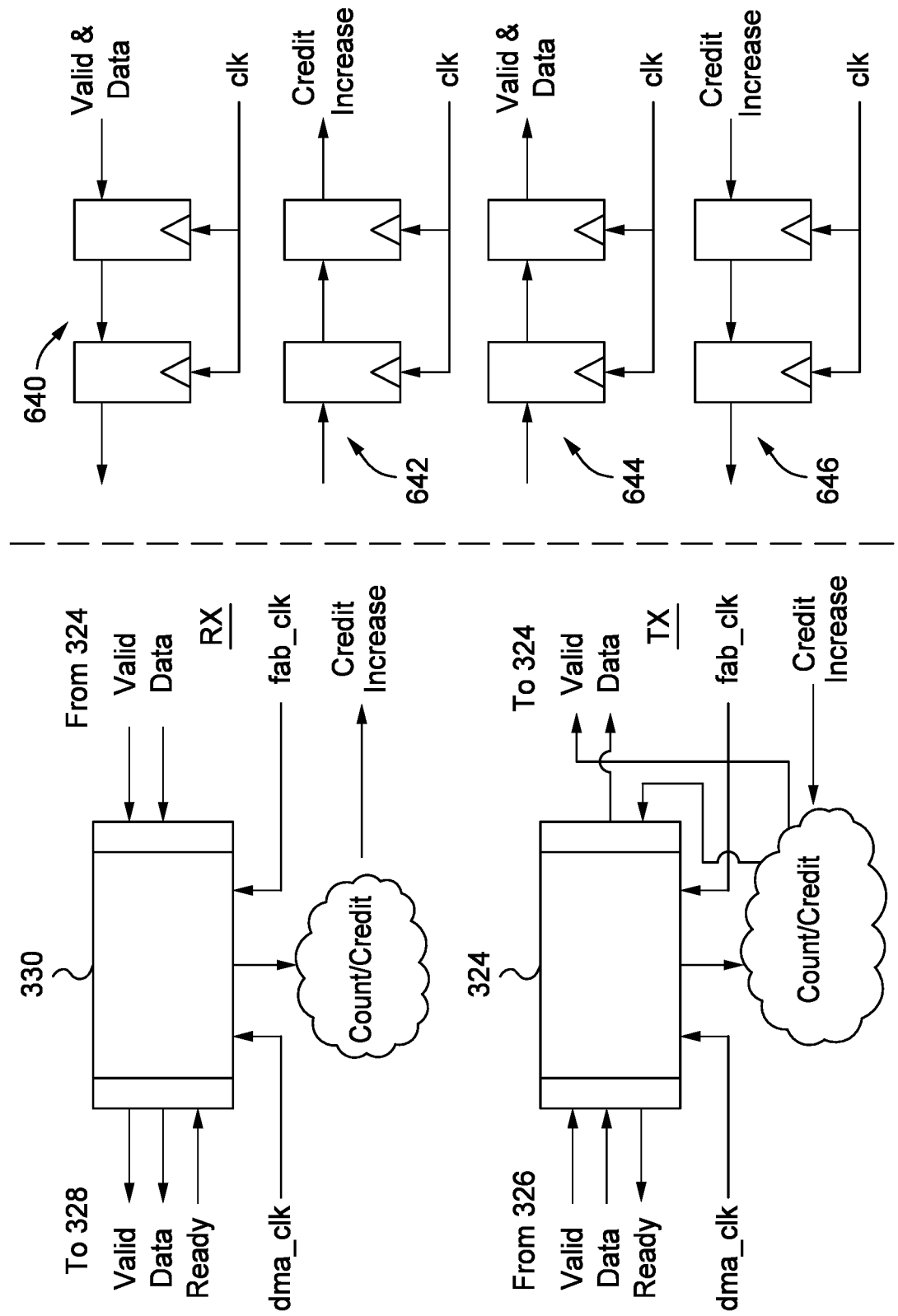
FIG. 6 illustrates a schematic logic block diagram of credit-based data transfer circuits.

Referring to FIG. 6, depicted is a schematic logic block diagram of credit-based data transfer circuits, according to one or more specific example embodiments of this disclosure. A fixed size AFIFO comprising a plurality of AFIFOs 324, 330 are used and instead of providing a Ready within a data transfer cycle use credits in combination with valid and ready control. The AFIFOs 324 provide credit returns to the data transmitters (e.g., offload circuitries 102 of FIG. 1) of multiplexer 326. The AFIFOs 330 provide credit returns to the data transmitters of AFIFOs 324. The demultiplexer 328 provide credit returns to the data transmitters of AFIFOs 330.

The data transmitters maintain internal counters of the credits (FIFO depth) and decrement the counter every time a data transmitter asserts valid and data signals. The data transmitter de-asserts the valid signal if there are not enough credits in its credit counter. The data transmitter credit counter increments every time a credit increment is received from the data receiver (e.g., the programmed circuit block 104). This allows the valid signal to be decoupled from the ready signal and provides for adding repeater flip-flops 640-646 (source synchronous) on the valid/data and Ready signals independently. The repeater flip-flops 640-646 are included to meet timing constraints between the AFIFOs 324 and the AFIFOs 330. For example, the repeater flip-flops 640-646 are used to control the timing of data that is transmitted between the AFIFOs 324 and the AFIFOs 330. It is contemplated and within the scope of this disclosure that other forms and methods of data transfer control may be used with equal effectiveness, and one having ordinary skill in the art of digital logic and the benefit of this disclosure could design such other data transfer control circuits.

While the foregoing is directed to embodiments of the present invention, other and further embodiments of the invention may be devised without departing from the basic scope thereof, and the scope thereof is determined by the claims that follow.

What is claimed is:

1. An interconnection circuitry comprising:
   a multiplexer configured to couple to first offload circuitry and receive data therefrom;
   a first plurality of buffers having inputs coupled to outputs of the multiplexer, wherein a first buffer group of the first plurality of buffers is connected to the first offload circuitry via the multiplexer, and a number of buffers of the first plurality of buffers within the first buffer group corresponds to a data width associated with the first offload circuitry and is less than a total number of buffers within the first plurality of buffers;
   a second plurality of buffers comprising inputs coupled to outputs of the first plurality of buffers; and
   a demultiplexer comprising inputs coupled to outputs of the second plurality of buffers and outputs coupled to inputs of programmable logic.

2. The interconnection circuitry of claim 1, wherein each of the first plurality of buffers comprises a first data bus width, and wherein each of the second plurality of buffers has a second data bus width.

3. The interconnection circuitry of claim 2, wherein the first data bus width is equal to the second data bus width.

4. The interconnection circuitry of claim 1, wherein a combined data bus width of the first buffer group is at least equal to a data bus width of the first offload circuitry.

5. The interconnection circuitry of claim 4, wherein a combined data bus width of the second plurality of buffers is at least equal to the data bus width of the first offload circuitry.

6. The interconnection circuitry of claim 1, wherein the multiplexer is further configured to couple to second offload circuitry and receive data therefrom, wherein a second buffer group of the first plurality of buffers is connected to the second offload circuitry via the multiplexer, and wherein the second plurality of buffers has inputs coupled to outputs of the second buffer group, and wherein the inputs of the demultiplexer are coupled to outputs of the second plurality of buffers.

7. The interconnection circuitry of claim 6, wherein a number of buffers of the second buffer group differs from the number of buffers of the first buffer group.

8. The interconnection circuitry of claim 1, wherein data is provided to each buffer of the first buffer group during a clock cycle of a first clock signal and based on the first buffer group having data capacity, and data is output from each buffer of the first buffer group during a clock cycle of a second clock signal and based on the first buffer group containing data, wherein the first clock signal differs from the second clock signal.

9. An accelerator device comprising:
   first offload circuitry; and
   interconnection circuitry coupled to the first offload circuitry, the interconnection circuitry comprising:
      a multiplexer coupled to the first offload circuitry;
      a first plurality of buffers comprising inputs coupled to outputs of the multiplexer, wherein a first buffer group of the first plurality of buffers is connected to the first offload circuitry via the multiplexer, and a number of buffers of the first plurality of buffers within the first buffer group corresponds to a data width associated with the first offload circuitry and is less than a total number of buffers within the first plurality of buffers;
      a second plurality of buffers comprising inputs coupled to outputs of the first plurality of buffers; and
      a demultiplexer comprising inputs coupled to outputs of the second plurality of buffers and outputs configured to couple to inputs of programmable logic.

10. The accelerator device of claim 9, wherein each of the first plurality of buffers comprise a first data bus width, and wherein each of the second plurality of buffers comprise a second data bus width, wherein the first data bus width is equal to the second data bus width.

11. The accelerator device of claim 9, wherein a combined data bus width of the first buffer group is at least equal to a data bus width of the first offload circuitry.

12. The accelerator device of claim 11, wherein a combined data bus width of the second plurality of buffers is at least equal to the data bus width of the first offload circuitry.

13. The accelerator device of claim 9 further comprising second offload circuitry, wherein the multiplexer is further configured to couple to the second offload circuitry, wherein a second buffer group of the first plurality of buffers is connected to the second offload circuitry via the multiplexer, and wherein the second plurality of buffers has inputs coupled to outputs of the second buffer group, and wherein the inputs of the demultiplexer are coupled to outputs of the second plurality of buffers.

14. The accelerator device of claim 13, wherein a number of buffers of the second buffer group differs from the number of buffers of the first buffer group.

15. The accelerator device of claim 9, wherein data is provided to each buffer of the first buffer group during a clock cycle of a first clock signal and based on the first buffer group having data capacity, and data is output from each buffer of the first buffer group during a clock cycle of a second clock signal and based on the first buffer group containing data, wherein the first clock signal differs from the second clock signal.

16. A method comprising:
    determining, based on a data bus width of a first offload circuitry, a first number of a first plurality of buffers within a first buffer group and a second number of a second plurality of buffers within a second buffer group, wherein the first number corresponds to a data width associated with the first offload circuitry and is less than a total number of buffers within the first plurality of buffers;

coupling inputs of the first plurality of buffers to outputs of a multiplexer, wherein inputs of the multiplexer are coupled to outputs of the first offload circuitry; and coupling inputs of the second plurality of buffers to outputs of the first plurality of buffers and coupling outputs of the second plurality of buffers to inputs of a demultiplexer, wherein outputs of the demultiplexer are coupled to inputs of programmable logic.

17. The method of claim 16, wherein each of the first plurality of buffers comprises a first data bus width, and each of the second plurality of buffers comprises a second data bus width, wherein the first data bus width is equal to the second data bus width.

18. The method of claim 16, wherein a combined data bus width of the first buffer group is at least equal to the data bus width of the first offload circuitry, and wherein a combined data bus width of the second buffer group is at least equal to the data bus width of the first offload circuitry.

19. The method of claim 16 further comprising:

determining, based on a data bus width of a second offload circuitry, a number of a third buffer group of the first plurality of buffers and a number of a fourth buffer group of the second plurality of buffers, wherein a number of the third buffer group differs from a number of the fourth buffer group;

coupling inputs of the third buffer group to outputs of the multiplexer, wherein inputs of the multiplexer are coupled to outputs of the second offload circuitry; and coupling inputs of the fourth buffer group to outputs of the third buffer group and coupling outputs of the fourth buffer group to the inputs of the demultiplexer, the number of the third buffer group differs from the first number of the first buffer group.

20. The method of claim 16 further comprising:

providing data to each of the first plurality of buffers during a clock cycle of a first clock signal and based on the first plurality of buffers having data capacity; and outputting data from each of the first plurality of buffers during a clock cycle of a second clock signal and based on the first plurality of buffers containing data, wherein the first clock signal differs from the second clock signal.

* * * * *